Figure 1:
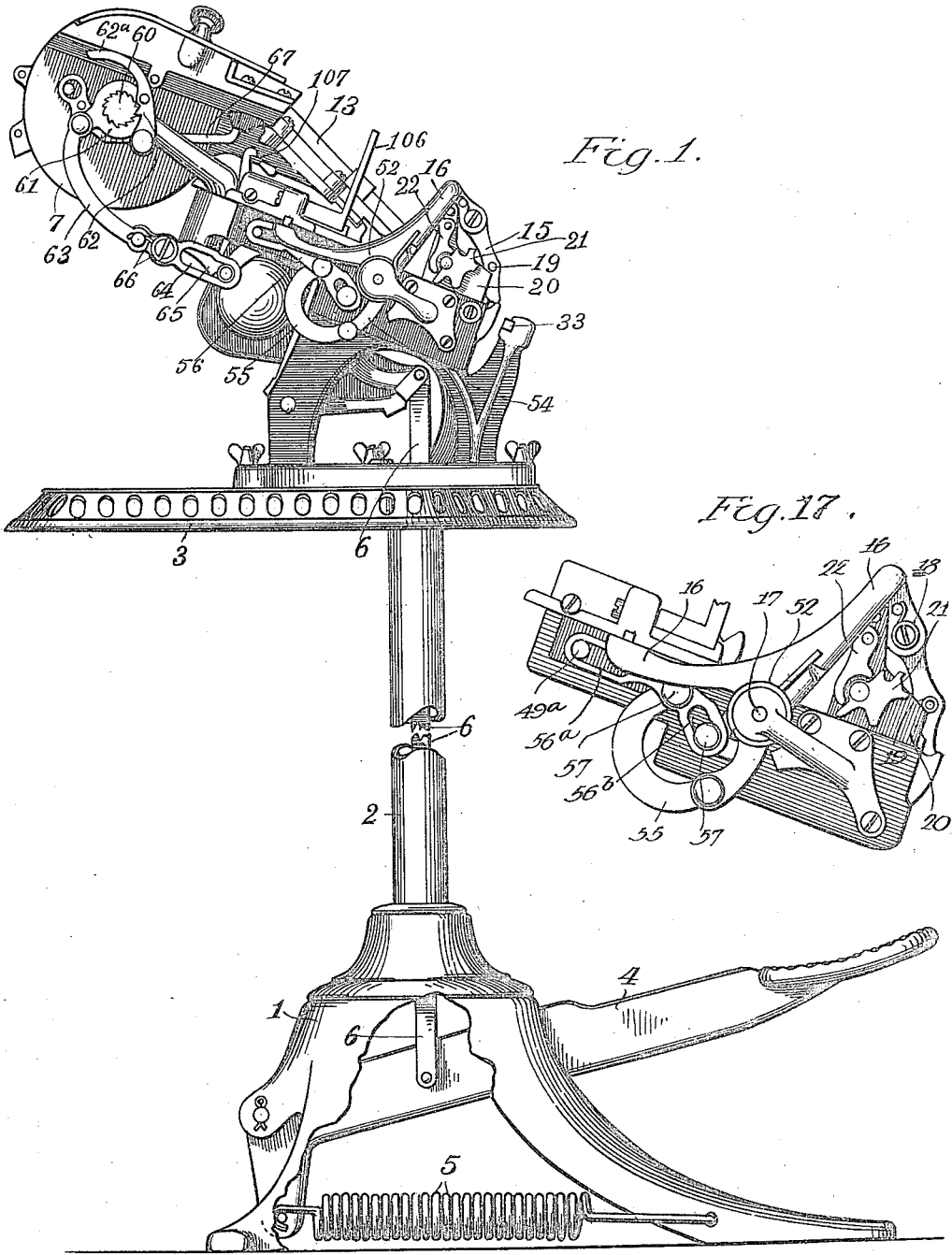

W. E. ELLIOTT.
AUTOMATIC BUTTON ATTACHING MACHINE.
APPLICATION FILED AUG. 19, 1912.

1,167,805.

Patented Jan. 11, 1916.
7 SHEETS—SHEET 3.

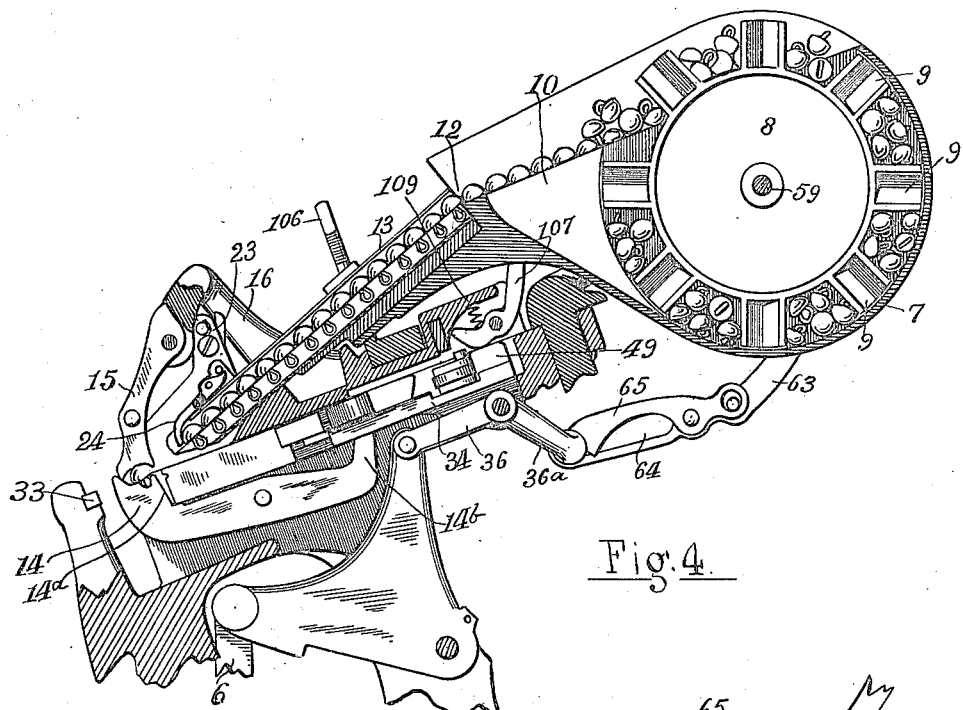

W. E. ELLIOTT.
AUTOMATIC BUTTON ATTACHING MACHINE.
APPLICATION FILED AUG. 19, 1912.

1,167,805.

Patented Jan. 11, 1916.
7 SHEETS—SHEET 5.

Witnesses
Harold O. Van Cortwerp
Ray W. Longfield

Inventor
William E. Elliott
By Luther V. Moulton
Attorney

W. E. ELLIOTT.
AUTOMATIC BUTTON ATTACHING MACHINE.
APPLICATION FILED AUG. 19, 1912.

1,167,805.

Patented Jan. 11, 1916.
7 SHEETS—SHEET 6.

Witnesses
Harold O. Van Antwerp
Ray W. Longfield

Inventor
William E. Elliott
By Luther V. Moulton
Attorney

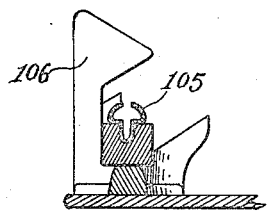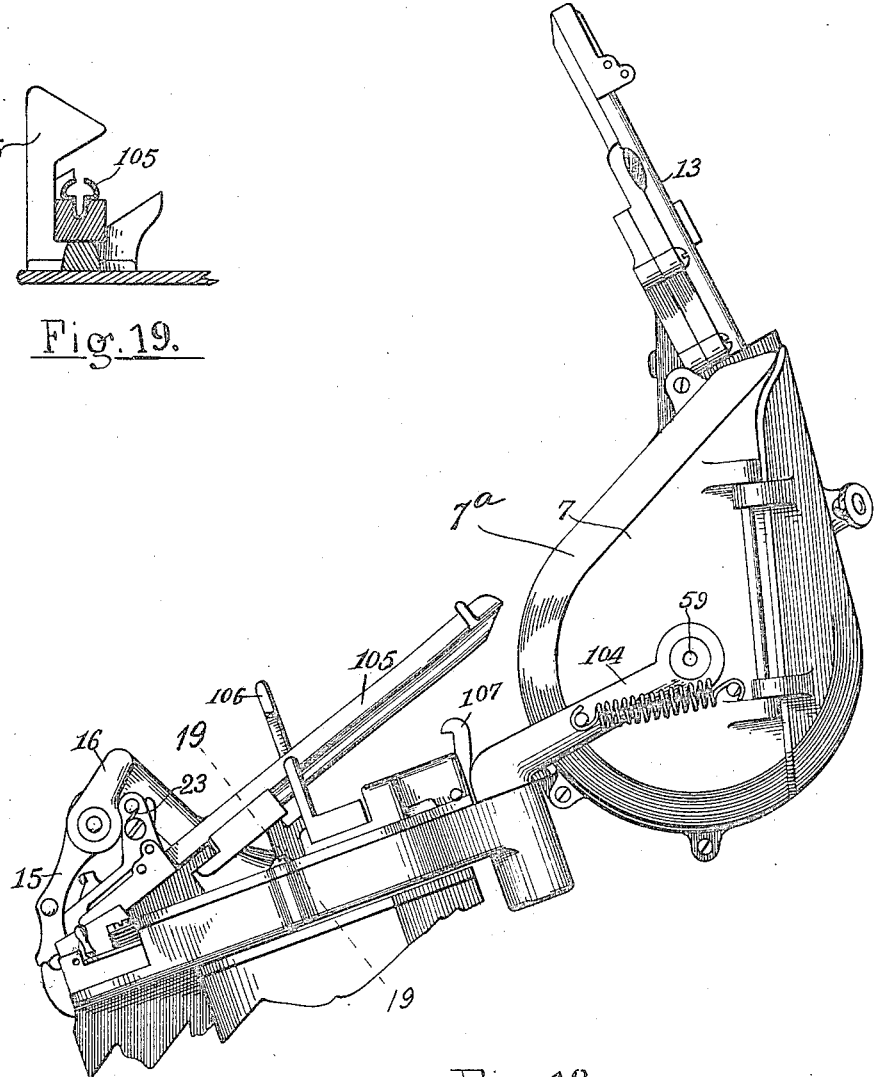

ic

UNITED STATES PATENT OFFICE.

WILLIAM E. ELLIOTT, OF GRAND RAPIDS, MICHIGAN.

AUTOMATIC BUTTON-ATTACHING MACHINE.

1,167,805.

Specification of Letters Patent.

Patented Jan. 11, 1916.

Application filed August 19, 1912. Serial No. 715,794.

*To all whom it may concern:*

Be it known that I, WILLIAM E. ELLIOTT, a citizen of the United States of America, residing at Grand Rapids, in the county of Kent and State of Michigan, have invented certain new and useful Improvements in Automatic Button-Attaching Machines; and I do hereby declare the following to be a full, clear, and exact description of the invention, such as will enable others skilled in the art to which it appertains to make and use the same.

My invention relates to improvements in button feeding mechanism for button attaching machines and more particularly to the type of machine adapted to attach the shoe buttons; and its object is to provide a device that will feed the buttons; prevent the buttons from being accidentally crushed or the machine broken; and to provide the device with various new and useful features of construction and arrangement as hereinafter more fully described and particularly pointed out in the claims.

The device consists essentially of a hopper to contain the buttons, a button chute leading from the hopper to the feeding finger, means within the hopper for automatically feeding the buttons into the chute, and a foot pedal by which the entire mechanism of the machine is operated with one movement.

In addition to these features, the machine is provided with a finger which intermittently moves into the button chute within the hopper to dislodge any buttons which may have become entangled or caught therein.

The button hopper is pivotally mounted in a bifurcated bracket and together with the button chute which is attached to it may be tilted upward to allow a separate button chute which contains buttons of a different size or color to be inserted in operative position on the machine. A catch automatically operated in conjunction with the other parts of the machine holds the hopper and chute down in operative position during the movement of the foot lever and it is impossible to raise the hopper and chute until the foot lever is released.

The machine is also provided with various other safety arrangements as will more fully appear by reference to the accompanying drawing in which:—

Figure 2:
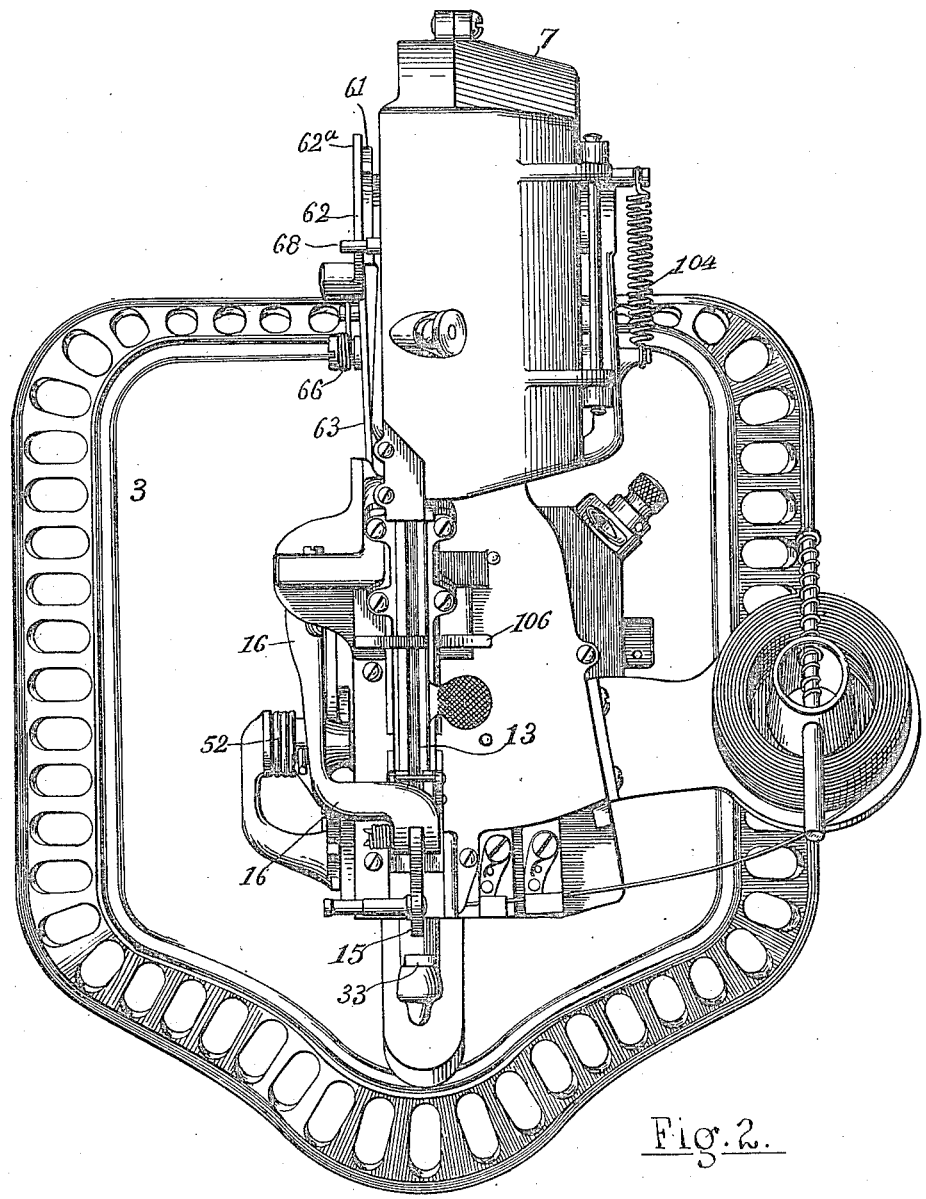
Figure 3:
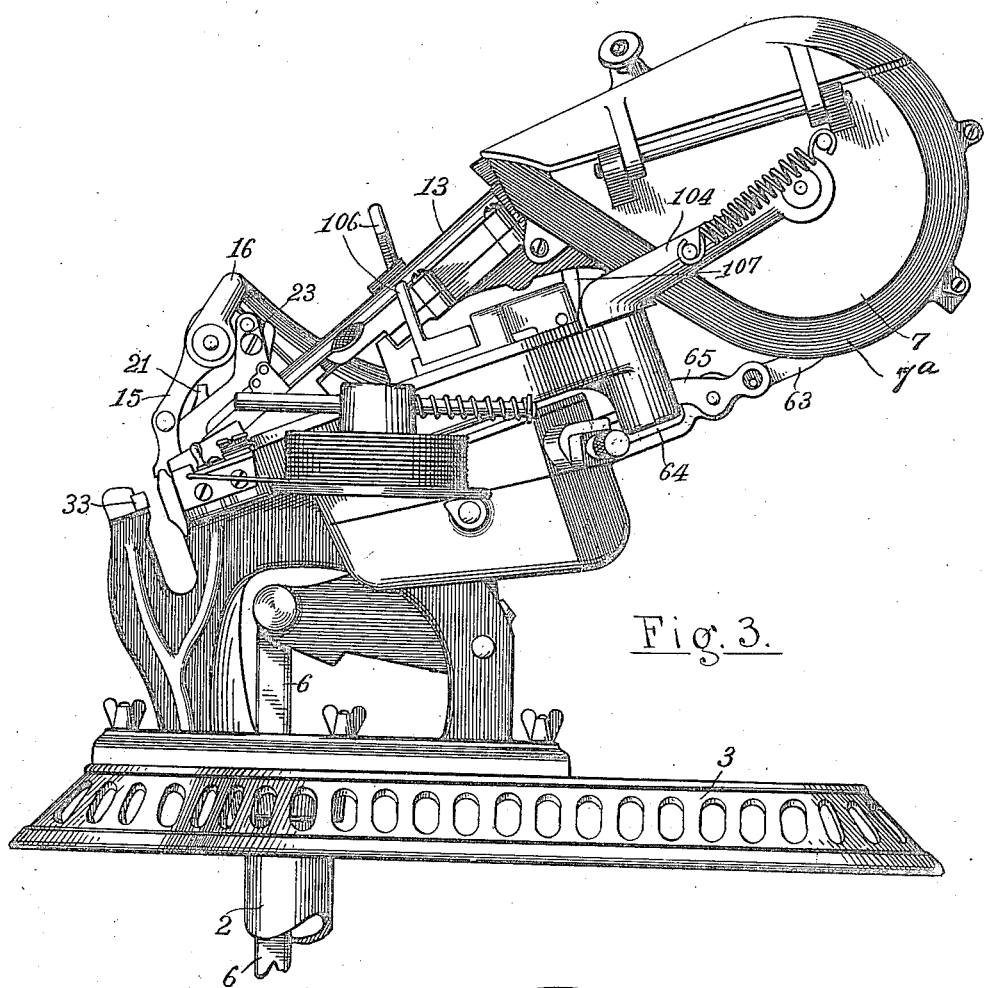
Figure 7:
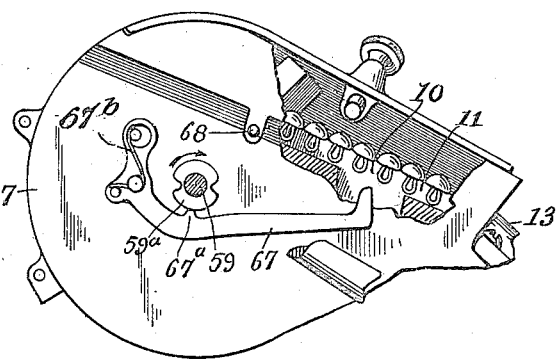
Figure 8:
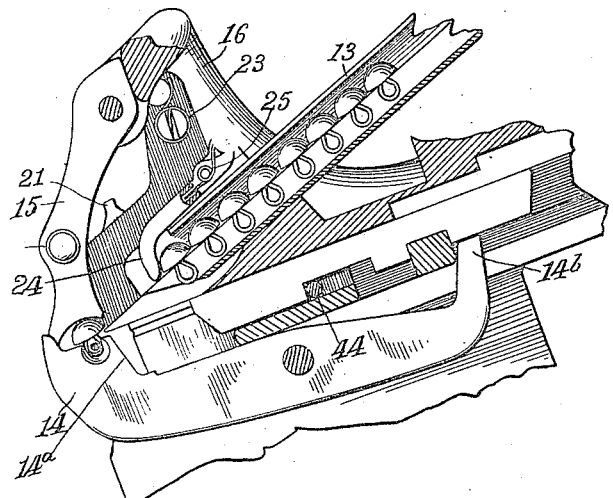
Figure 10:
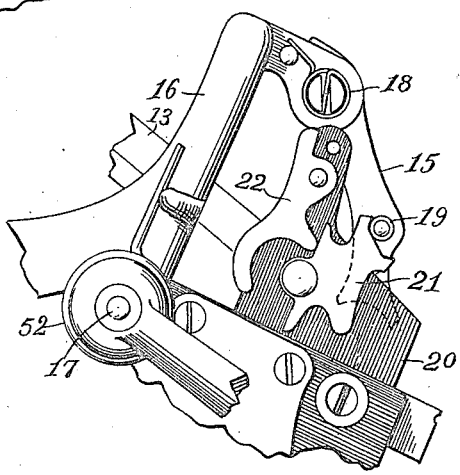
Figure 9:
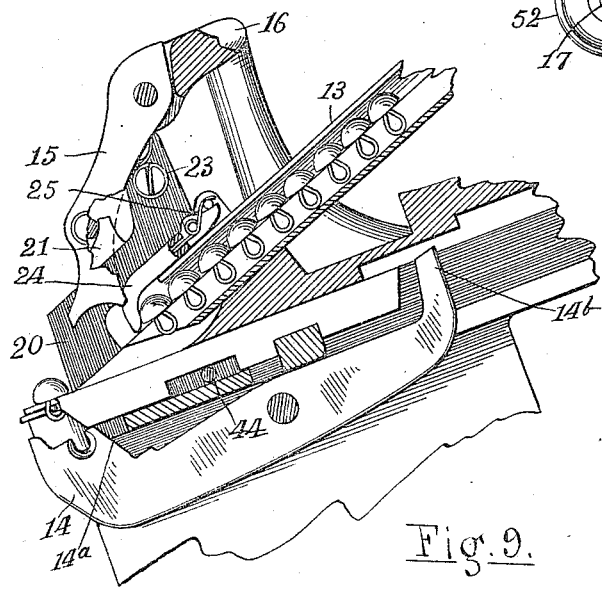
Figure 11:
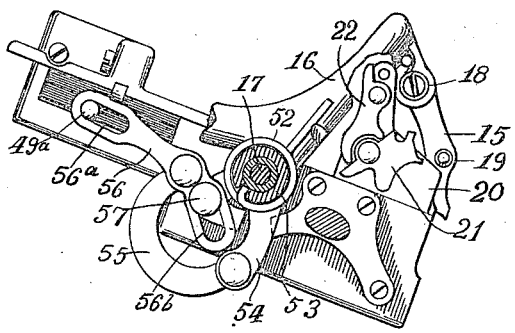
Figure 12:
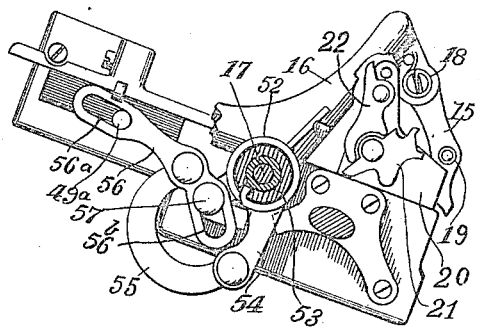
Figure 13:
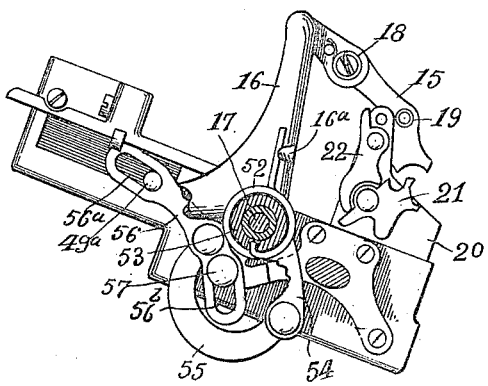
Figure 14:
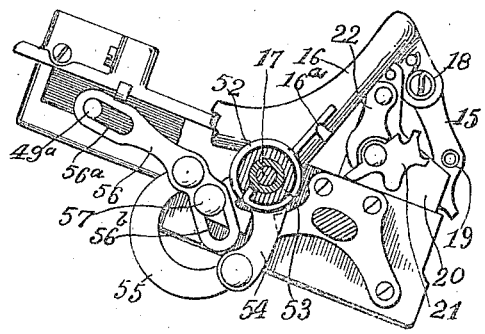
Figure 15:
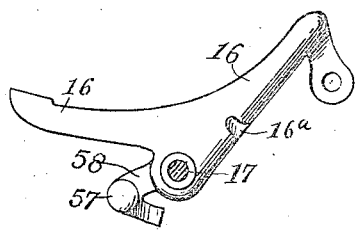
Figure 16:
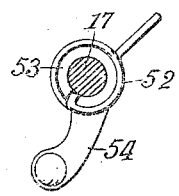

Figure 1 is a side elevation of the button attaching machine complete; Fig. 2 is a plan view of the same; Fig. 3 is an enlarged elevation of the upper part of the machine viewed from the opposite side to Fig. 1; Fig. 4 is a sectional elevation through the button chute, hopper and staple forming mechanism; Fig. 5 is an elevation of the upper portion of the machine with parts broken away showing the dislodging finger and parts which operate the feeding finger; Fig. 6 is a detail showing the safety arrangements in the link which operates the button feeding wheel in the hopper; Fig. 7 is a detail illustrating the operation of the dislodging finger; Fig. 8 is an enlarged sectional detail of the lower end of the button chute, the feeding finger and the anvil showing a button fed into the anvil; Fig. 9 shows the same parts with the anvil moved downward out of the path of the forming die and the feeding finger moving forward on its up stroke; Fig. 10 shows the same parts illustrated in Fig. 9 viewed from the opposite side; Figs. 11, 12, 13 and 14 are details of the button feeding finger and parts relating thereto in their positions at different stages of their operation; Fig. 15 is a detail of the arm which carries the feeding finger; Fig. 16 is a detail of the lever, hub and spring which operate the arm; Fig. 17 is a detail in elevation of the button feeding finger and parts relating thereto shown in the position they would assume when no button is engaged by the finger; Fig. 18 is an elevation showing the hopper and fixed chute tilted upward with the spare button chute in place; and Fig. 19 is a section on the line 19—19 of Fig. 18.

1 represents the base of the pedestal. A tubular post 2 extends upward from the base and has a table 3 attached to its upper end. A foot lever 4 in the form of a bell crank is pivoted in the base 1 and a coiled spring 5 is attached to the downwardly extended arm of the bell crank and holds the foot pedal normally in raised position. A connecting rod 6 is attached to the lever 4 and extends upward through the post 2 and transmits the movement of the foot lever to the machine above.

7 is the button hopper which contains a wheel 8 rotative in a vertical plane. This wheel is located close to one side of the hopper and is provided on its periphery with radially extending fins 9. These fins are of V shape in cross section having their apex or angle close to the adjacent side of the hopper; the peripheral portion of the hopper is inclined toward the wheel as at 7ᵃ so that the buttons contained therein will slide toward the wheel and accumulate between the fins 9. As this wheel is turned by automatic means hereafter described the buttons will be carried upward by the fins 9 and deposited upon the ledge 10 which is provided in the upper part of the hopper and is inclined downward toward the front of the machine. This ledge has a groove 11 in its upper side extending its entire length, the groove being of sufficient width and depth to accommodate the eye of a button. As the buttons are heaped upon the ledge some of them will fall in such a position that their eyes will drop into the groove and these buttons will slide downward along the ledge and through an opening 12 into the button chute 13 which is also inclined downward toward the front of the machine and leads to the anvil 14 and staple forming mechanism. A bell crank lever 16 is pivoted on a stud 17 which projects from one side of the frame of the machine; the upper end of this crank is extended forward and a finger 15 is pivotally attached thereto and yieldably held downward by means of a spring 18 which is coiled about its pivot. A roller 19 projects from the side of the finger 15 and traverses the face of the guide block 20 which guides the movement of the finger. The bell crank arm 16 is operated by means hereafter described to carry the finger upward and as the finger moves upward and the roller 19 traverses the face of the guide block the roller will engage an elevating shoe 21 pivoted to the face of the guide block 20 which lifts the finger upward and over the buttons in the lower end of the chute. This movement is illustrated in Figs. 9 and 10. A spring actuated lever 22 having a yoke shaped end engages the back side of the elevating shoe 21. The yoke end of this lever straddles the pivot of the shoe and holds it yieldably in operative position. The lever 22 is operated by a spring 23 coiled about its pivot. On the return stroke of the feeding finger 15 the roller 19 traverses the face of the guide block 20 until the lower end of the finger engages the bottom button in the chute and slides it beneath the spring actuated button retainer 24 down to the anvil 14 in which position it is held by the finger until the wire for the staple is threaded through the eye and a staple is cut off and formed. The button retainer 24 at the bottom of the button chute consists of a fork shaped member pivotally attached thereto and yieldably depressed by a spring 25.

The bell crank arm 16 which carries the button feeding finger is operated through connecting links from the right angle projection 49 on the drive member 34. When at rest as shown in Fig. 5 this arm 16 is held forward under tension of a spring 52 which engages a lug 16ᵃ on the arm and is coiled about the hub 53 of the arm 54 and attached thereto. The hub is freely rotative upon the hub of the arm 16 and the arm 54 is connected to the slotted rod 56 by means of a curved link 55. The rod 56 is provided with slots 56ᵃ and 56ᵇ in its respective upper and lower ends, the slots 56ᵃ being traversed by the stud 49ᵃ on the end of the projection 49 on the main driving member and the slot 56ᵇ traversed by a stud 57 on a projection 58 from the bell crank lever 16.

The first movement of the main driving member releases the rod 56 which is drawn forward by the arm 54 and connecting link 55 as the spring 52 uncoils and the stud 57 traverses the slot 56ᵇ until it reaches the end of the same. This stops the movement of the rod 56 and further movement of the drive member moves the stud 49ᵃ in the slot 56ᵃ until the end of this slot is reached. The arm 16 and finger 15 have so far remained stationary in order to hold the button on the anvil while the staple is formed. The rod 56 now exerts a direct thrust on the stud 57 and projection 58 and as the main driving member finishes its forward stroke the arm 16 rises carrying the button feeding finger over the elevating shoe 21 to the top of its stroke. The first step of the return movement carries the stud 49ᵃ to the opposite end of the slot 56ᵃ and further movement moves the arm 54 through the connecting link 55 which carries the arm 16 downward under tension of the spring 52. These various movements are shown consecutively in Figs. 5, 11, 13 and 14.

The button feed wheel in the hopper is operated by a ratchet wheel and connecting links from a downward projection 36ᵃ on the connecting link 36 (see Fig. 4). The outer end of the shaft 59 on which the feed wheel is mounted is provided with a ratchet wheel 60. A disk 61 is rotatably mounted on the shaft adjacent to the rotary wheel and a pawl 62 is pivotally attached to the disk and weighted to insure its engagement with the ratchet teeth. A connecting link 63 connects an arm on the disk 61 to which it is attached to the extension 36ᵃ. The lower end of this connecting link is provided with a safety device which consists of a slot 64 through which the stud on the extension 36ᵃ passes. This stud is held in the forward end of a slot 64 by means of a trip lever 65 the inclined end of which engages the stud and takes the thrust of the same. This lever is pivotally attached to the connecting link 63 and is yieldably held in position by means of a spring 66 which is coiled about its pivot. As the projection 36ᵃ moves back and forward with the movement of the drive member 34 the connecting rod 63 will transmit this movement to the disk 61 which will intermittently rotate the ratchet wheel 60 and button feed wheel 8 through the pawl 62. An upward extension 62ª on the pawl is arranged to engage a pin 68 which extends from the side of the hopper to insure the disengagement of the pawl 62 at the end of its stroke.

Should the buttons become clogged in the hopper and stop the movement of the feed wheel the added resistance will cause the trip lever 65 which takes the thrust of the stud on the extension 36ª to rise and allow the stud to traverse the slot 64 and thus prevent crushing the buttons.

It sometimes happens that the buttons will accumulate or become heaped on the ledge 10 in the button hopper and in order to free this accumulation and clear the slot 11 a dislodging finger 67 is pivoted at the side of the hopper and is adapted to intermittently move upward into the slot 11. This finger is provided with a hump 67ª which engages a cam 59ª fixed on the shaft 59 (see Fig. 7). The cam has depressions in its periphery into which the hump 67 rises as the cam rotates thus allowing its free end to move upward by the action of a spring 67ᵇ for the purpose described.

It is sometimes necessary to use a different size or color of buttons than those contained in the hopper and for this purpose the hopper together with the button chute attached thereto are pivotally mounted in fork shaped bracket 104 and may be turned upward so that a spare button chute 105, which is manually filled with the desired kind of buttons may be inserted in operative position. In order to facilitate inserting the spare button chute and also to insure leading the attached button chute to their proper positions, a guide plate 106 is provided which has various inclined faces which engage the chute as it descends and leads it to its proper place.

When the attached chute is in operative position a latch 107 is allowed to engage a detent 108 on the under side of the chute holder during the working stroke of the foot pedal. This latch 107 is in the form of a pivoted bell crank, one end of which is engaged by the projection 49 on the main driving member. When released during the forward stroke of the said member the spring 109 hooks the latch over the detent thus making it impossible to raise the button chute during the operation of the machine.

In operating this button attaching machine, the shoe buttons are placed in the hopper in the usual manner and the machine is now ready for use. The operator places the shoe in such position that the point where the button has to be attached lies between the clenching die 33 and the anvil 14. The foot pedal is then depressed and as it moves downwardly the various parts of the machine are set into operation and the buttons are fed as previously described in the detailed description. Each depression of the foot pedal causes one button to be fed and upon the release thereof the button feeding finger 15 moves again to its initial position ready to fit another button in place on the anvil.

From the foregoing description taken in connection with the accompanying drawing it will be manifest that a button feeding mechanism is provided which will fulfil all of the necessary requirements of such a device.

The button setting mechanism herein shown is made the subject of a divisional application filed May 9th, 1913, Serial No. 766,660 renewed Oct. 19, 1914, Serial No. 867,535, and the counting and controlling mechanism herein shown is made the subject of a divisional application filed May 9th, 1913, Serial No. 766,659, renewed Mar. 8, 1915, Serial No. 12,889.

What is claimed is:—

1. A button feeding device for a button setting machine, comprising a feed wheel, radially extending, V shaped fins on the wheel, a hopper inclosing the wheel, said hopper having a vertical side close to the apex of the fins and a peripheral portion inclined toward the wheel, and an inclined ledge in the upper part of the hopper having a groove to receive the eyes of the buttons.

2. A button feeding device for a button setting machine, comprising a button feed wheel, a ratchet wheel connected to the feed wheel, a reciprocating pawl engaging the ratchet wheel, a slotted link connected to the pawl, a reciprocating stud slidable in the slot, and a yieldable trip lever having an inclined end to yieldably hold the stud in one end of the slot and adapted to release the same under abnormal stress.

3. A button feeding device for a button setting machine, comprising a reciprocating driving member carrying a stud, a slotted link carried by the stud at one end and connected at the other end to an oscillating disk, a pawl carried by the disk, a ratchet wheel engaged by the pawl, a button feed wheel rotated by the ratchet wheel, a trip lever having an inclined end engaging the stud to hold the same in one end of the slot in the link, and a spring to yieldably hold the said inclined end in engagement with the stud.

4. A button feeding device for a button setting machine, comprising a button chute, means for supplying buttons to the chute, a bell crank lever, means for reciprocating said lever, a finger pivoted to one arm of the lever, a spring to yieldably turn the finger toward the chute, a guide block, a roller on the finger traversing the guide block, an elevating shoe pivoted to the guide block and engaged by the roller to lift the finger over the lower button in the chute, and a spring lever having a divided end engaging the shoe to yieldably retain the same in operative position.

5. A button feeding device for a button setting machine, comprising a bell crank lever, a button feeding finger carried on one arm of the lever, a spring to hold the lever in forward position, a reciprocating driving member, studs on the said member and lever, a connecting rod having slotted ends engaging the studs, a spring engaging the lever at one end and mounted on a rotative hub at the other end, an arm on the hub and a link connecting the arm and the said slotted rod.

6. A button feeding device for a button setting machine, comprising a frame, a stud fixed in the frame, a lever and an arm pivoted on the stud, a finger carried by the lever, a reciprocating driver, a rod connecting the driver and lever, a link connecting the rod and the arm, and a spring connecting the lever and the arm.

7. A button feeding device for a button setting machine, comprising a hopper having a ledge provided with a groove and slot, means for depositing buttons on said ledge, a finger adapted to project through the slot and groove, and means for reciprocating the finger.

8. A button feeding device for a button setting machine, comprising a hopper having a ledge in its upper part provided with a groove and slot, a feed wheel adjacent the ledge mounted on a shaft journaled in the hopper, a finger pivoted at one end and extending through the slot in the ledge at the other end, a spring to project the finger through the slot and a cam on the shaft to withdraw the finger from the slot.

9. A button feeding device for a button setting machine, comprising a button hopper pivoted to the machine and adapted to swing upwardly out of operative position, a button chute carried by the hopper and adapted to swing upwardly therewith and adapted to supply buttons in succession to the said mechanism when in operative position, a latch adapted to hold the button chute and hopper in place when the button setting mechanism is in operation, and a guide plate to position the button chute on the hopper, or to position a separate button chute in like manner as occasion requires.

10. A button feeding device for a button setting machine, comprising a bracket mounted on the machine, a button hopper pivotally mounted on the bracket, and arranged to be swung upwardly above the machine out of operative position, a button chute carried by the hopper and adapted to swing upwardly therewith, a detent on the chute, a latch engaging the detent when the chute is in operative position, a guide plate to position the chute in operative position, and means for locking the latch when the button setting machine is in operation.

In testimony whereof I affix my signature in presence of two witnesses.

WILLIAM E. ELLIOTT.

Witnesses:
HAROLD O. VAN ANTWERP,
LUTHER V. MOULTON.

Copies of this patent may be obtained for five cents each, by addressing the "Commissioner of Patents, Washington, D. C."